United States Patent Office 3,438,746
Patented Apr. 15, 1969

3,438,746
EXTRACTION OF WET PROCESS PHOSPHORIC ACID USING ORGANIC SULFOXIDES
Gilbert Cousserans and Robert Amanrich, Toulouse, France, assignors to Office National Industriel de l'Azote, Toulouse, France
No Drawing. Filed Aug. 31, 1966, Ser. No. 576,250
Claims priority, application France, Sept. 2, 1965, 30,193
Int. Cl. B01j 9/00; C01b 25/22
U.S. Cl. 23—312                    12 Claims The present invention relates to the wet process production of pure phosphoric acid.

Numerous processes have been developed for the manufacture of phosphoric acid by the acid decomposition of natural phosphates. Among these processes, the oldest and most classical consist in treating the mineral or ore with sulphuric acid, separating insoluble calcium sulphate, and then subjecting the filtered or dewatered solution to concentrate the obtained phosphoric acid. The impurities contained in the starting materials and remaining in the final product make the latter unsuitable for certain uses, as for example in the food industry or in fertilizer solutions.

It is for this reason that, in recent years, research work was carried out resulting in the development of techniques for the selective extraction of phosphoric acid by means of suitable solvents, such as tributyl phosphate or $C_4^-$ to $C_8^-$ alcohols such as n-butanol or isoamyl alcohol, which are applicable not only to solutions obtained by sulphuric acid decomposition of phosphates, but are also applicable to solutions resulting from the treatment of phosphatic mineral ores with hydrochloric or nitric acid.

By using such selective solvent extraction processes, it is generally possible to produce much purer products than those obtained by the classic procedures, but the economic value thereof depends upon the characteristics of the selected solvent: high dissolving power and selectively with respect to phosphoric acid, low solubility in water and easy recovery from dilute aqueous solutions, high stability under the operating conditions, low viscosity and low cost price, to mention only the most important characteristics.

Among these characteristics, the first two are fundamental. As a matter of fact, the higher the partition coefficient of phosphoric acid between the solvent and the aqueous solution, the greater the possibility of limiting the number of extraction stages and the volume of the solvent being circulated. The same is true for the selectivity coefficient of the solvent with respect to phosphoric acid, this coefficient being defined by the ratio of the partition coefficients of phosphoric acid and of the impurities, such as calcium chloride or calcium nitrate, formed during the acid decomposition: increasing this coefficient makes it possible to reduce the number of purification stages or, with a given number of stages, to obtain purer phosphoric acid.

The present invention relates to a process for the selective extraction of phosphoric acid from solutions resulting from the sulphuric acid- or hydrochloric acid-decomposition of natural phosphates, by means of solvents having characteristics which are much superior to those of known extraction solvents. The solvents employed in the present invention are organic sulfoxides of the formula

R—SO—R' wherein R and R' represent the same or different alkyl, aralkyl or aryl groups, such as di-n-butyl-, di-isobutyl-, dipentyl-, dihexyl-, didodecyl-, diphenyl-, dichlorethyl-, diethoxyethyl-, dibenzyl-, phenylbenzyl-, dodecylvinyl-sulfoxides, etc., severally or in admixture.

The process is equally applicable to the purification of "green" wet process-produced phosphoric acid solutions obtained by sulphuric acid decomposition of phosphatic rocks, with subsequent separation of insoluble calcium sulphate.

In addition to their exceptional dissolving power and their exceptional selectivity, the solvents of the invention present the advantage, due to their properties of low solubility in water and their high stability, of the possibility of easy recovery and recycling.

Generally, the extract containing the solvent and phosphoric acid is subjected to a further extraction with water, the recovered solvent being recycled to the head of the process and the aqueous phase being concentrated to the desired extent.

There is thus obtained a phosphoric acid solution of desired concentration, ranging for example from 25% to 60% of $P_2O_5$ and containing less than 0.25% of impurities constituted primarily by calcium salts in addition to practically indeterminable traces of fluorine compounds and aluminum (alumina) compounds.

The foregoing range is however not intended to be restrictive.

These phosphoric acid solutions can be subsequently treated, according to conventional purification procedures, to produce pure acid.

The following examples are intended primarily as illustrative and to highlight the advantages afforded by the solvents of the present invention in comparison with conventional technique. The said examples are not intended to be limitative.

EXAMPLE 1

In order to compare the fundamental characteristics of non-solvents with those of di-butylsulfoxide, the partition coefficients of calcium chloride and of phosphoric acid, on the one hand, and the selectivity coefficient for phosphoric acid in relation to calcium chloride in each of the tested solvents, on the other hand, is determined. Tests are run with a synthetic mixture containing 4% of HCl, 16% of $H_3PO_4$, 20% of $CaCl_2$ and 60% of water (by weight) in the proportion of 1 part of solvent per part of phosphoric acid solution. The results achieved after equilibrating at 40° C. are shown in the following table:

| Solvent | $K_{CaCl_2}$ | $K_{H_3PO_4}$ | Selectivity coefficient |
|---|---|---|---|
| n-Butyl alcohol | 0.087 | 0.776 | 8.9 |
| Isoamyl alcohol | 0.042 | 0.574 | 13.7 |
| Tributyl phosphate | 0.067 | 0.974 | 14.5 |
| Di-n-butylsulfoxide | 0.090 | 2.890 | 32.1 |

EXAMPLE 2

By decomposition of natural Morocco phosphates with hydrochloric acid, there is obtained a solution of the following composition by weight:

| | Percent |
|---|---|
| HCl | 4.42 |
| $H_3PO_4$ | 11.80 |
| $CaCl_2$ | 24.70 |
| F (combined) | 0.80 |
| $Fe_2O_3$ | 0.045 |
| $(SO_3)$ | 0.055 |
| $Al_2O_3$ | 0.036 |
| MgO | 0.11 |
| Balance water. | |

By way of comparison, this decomposition solution is admixed with an equal part of each of the solvents tested in Example 1. After equilibrating at 40° C. the three extraction media thus obtained, the partition coefficient of the different constituents and also the selectivity coefficient of the solvent are determined for phosphoric acid relatively to calcium chloride. The average results obtained, and shown in the following table, establish that the characteristics of di-n-butyl sulfoxide are distinctly superior to those of the other tested solvents.

| Solvent | Isoamyl alcohol | Tributyl phosphate | Di-n-butyl-sulfoxide |
|---|---|---|---|
| $K_{H_3PO_4}$ | 0.845 | 1.44 | 3.74 |
| $K_{CaCl_2}$ | 0.040 | 0.073 | 0.090 |
| Selectivity coefficient | 21.1 | 19.7 | 41.5 |
| $K_{HCl}$ | 11.2 | 0.756 | |
| $K_F$ (combined) | 0.087 | 0.367 | 0.040 |
| $K_{(SO_3)}$ | 0.56 | 0.46 | 0.39 |
| $K_{MgO}$ | 0.103 | 0.05 | 0.0 |
| $K_{Fe_2O_3}$ | 0.05 | 0.0 | 0.0 |
| $K_{Al_2O_3}$ | 0.465 | 0.133 | 0.208 |

EXAMPLE 3

The hydrochloric acid-decomposition solution of Example 2, heated to 40° C., is continuously fed into an extractor of the 3-stage mixing-settling-decanting type at the rate of 5 kilograms per hour. 8.0 kilograms per hour of di-n-butylsulfoxide at 40° C. are introduced at the other end of the reactor.

There were thus obtained:

(1) 8.3 kg/hour of extract containing:

| | Percent |
|---|---|
| HCl | 2.48 |
| $H_3PO_4$ | 6.54 |
| $CaCl_2$ | 0.022 | as well as traces of fluorine compounds and alumina compounds. The other two constituents of the decomposition solution, magnesia and iron oxide, are not detectable.

(2) 4.1 kg./hour of raffinate containing:

| | Percent |
|---|---|
| $H_3PO_4$ | 0.19 |
| $CaCl_2$ | 30.0 |
| F (combined) | 0.97 |
| MgO | 0.134 |
| $Fe_2O_3$ | 0.061 |
| $Al_2O_3$ | 0.050 |
| Solvent (di-n-butylsulfoxide) | 0.37 |
| Balance water. | |

The raffinate was free of hydrochloric acid.

These results correspond to a recovery of phosphoric acid equal to 98.7% in only three stages and while using a very low solvent-to-extraction mixture ratio, of the order of 1.6.

The quality of the extract is sufficient for most uses of phosphoric acid, especially for the manufacture of fertilizer solutions. It is thereafter sufficient to again extract the phosphoric acid with water, to eliminate the hydrochloric acid and recycle the same, and to concentrate the phosphoric acid.

There is thus obtained phosphoric acid with 55% of $P_2O_5$, free from magnesia and iron oxide, and comprising only 0.15% of impurities, the latter being constituted principally by calcium oxide, alumina and fluorine compounds being present only in practically indeterminable traces.

The recovery of small amounts of solvent present in the raffinate and in the aqueous solution from the second extraction, is carried out without difficulty by extracting by means of a water-insoluble solvent, such for example as benzene.

Under these conditions, the consumption of the di-n-butylsulfoxide is less than 0.5 kilogram per ton of $P_2O_5$ extracted, which attests to the high stability of the solvent employed.

EXAMPLE 4

To purify a phosphoric acid solution resulting from the decomposition of phosphate ore by sulphuric acid and having the following composition (by weight)

| | Percent |
|---|---|
| $H_2PO_4$ | 44.0 |
| CaO | 0.17 |
| F (combined) | 1.40 |
| $(SO_3)$ | 3.25 |
| $Fe_2O_3$ | 1.30 |
| $Al_2O_3$ | 1.50 | one part by weight of the solution is submitted to extraction in three stages with two parts by weight of di-n-butylsulfoxide and, after re-extraction with water and concentrating, there is obtained a 55%-$P_2O_5$ phosphoric acid containing only traces of CaO, $Fe_2O_3$ and fluorine compounds, the only determinable impurities being:

| | Percent |
|---|---|
| $(SO_3)$ | 0.17 |
| $Al_2O_3$ | 0.04 |

Results essentially analogous to those obtained in the foregoing examples are obtained when the di-n-butylsulfoxide is replaced by a corresponding amount of any of the other herein-enumerated sulfoxides.

What is claimed is:

1. In a method for the selective extraction of phosphoric acid from a solution resulting from the decomposition by a member selected from the group consisting of sulfuric acid and hydrochloric acid by subjecting the said solution to extraction with a solvent and recovering $P_2O_5$ from the obtained extract, the improvement according to which the extraction is carried out with a solvent selected from the group consisting of di-n-butylsulfoxide, di-isobutylsulfoxide, dipentylsulfoxide, dihexylsulfoxide, didodecylsulfoxide, diphenylsulfoxide, dichloroethylsulfoxide, diethoxyethylsulfoxide, dibenzylsulfoxide, phenylbenzylsulfoxide and dodecylvinylsulfoxide and mixtures thereof.

2. The improvement according to claim 1, wherein the solvent is di-n-butylsulfoxide.

3. The improvement according to claim 1, wherein the solvent is di-isobutylsulfoxide.

4. The improvement according to claim 1, wherein the solvent is dipentylsulfoxide.

5. The improvement according to claim 1, wherein the solvent is dihexylsulfoxide.

6. The improvement according to claim 1, wherein the solvent is didodecylsulfoxide.

7. The improvement according to claim 1, wherein the solvent is diphenylsulfoxide.

8. The improvement according to claim 1, wherein the solvent is dichlorethylsulfoxide.

9. The improvement according to claim 1, wherein the solvent is diethoxyethylsulfoxide.

10. The improvement according to claim 1, wherein the solvent is dibenzylsulfoxide.

11. The improvement according to claim 1, wherein the solvent is phenylbenzylsulfoxide.

12. The improvement according to claim 1, wherein the solvent is dodecylvinylsulfoxide.

References Cited

UNITED STATES PATENTS

| | | | |
|---|---|---|---|
| 2,880,063 | 3/1959 | Baniel | 23—312 X |
| 3,072,461 | 1/1963 | Long | 23—312 X |
| 3,186,809 | 6/1965 | Kreevoy | 23—165 X |
| 3,204,003 | 8/1965 | Ray | 23—312 X |

OTHER REFERENCES

Crown Zellerbach Corporation—Technical Bulletin DMSO—Dimethyl Sulfoxide, Chemical Products Division, Carmas, Washington, May 1964, p. 14.

NORMAN YUDKOFF, *Primary Examiner.*

S. J. EMERY, *Assistant Examiner.*

U.S. Cl. X.R.

23—165; 260—607